United States Patent [19]

Harris

[11] Patent Number: 5,479,583
[45] Date of Patent: Dec. 26, 1995

[54] MEANS TO ACHIEVE A SQUARE INTENSITY PROFILE AT AN IMAGE PLANE BY INTENSITY AND PHASE PROFILING

[75] Inventor: Ellis D. Harris, Claremont, Calif.

[73] Assignee: Xerox Corporation, Stamford, Conn.

[21] Appl. No.: 236,846

[22] Filed: May 2, 1994

[51] Int. Cl.⁶ .................................................. G02B 26/08
[52] U.S. Cl. ........................... 395/101; 359/216; 359/196
[58] Field of Search ........................................ 359/196, 394, 359/216, 738; 606/17; 395/101, 109

[56] References Cited

U.S. PATENT DOCUMENTS

| | | | |
|---|---|---|---|
| 5,136,424 | 8/1992 | Cox et al. | 359/394 |
| 5,261,904 | 11/1993 | Baker et al. | 606/17 |
| 5,289,564 | 2/1994 | Morimoto et al. | 395/109 |
| 5,309,272 | 5/1994 | Harris | 359/196 |
| 5,315,427 | 5/1994 | Rauch et al. | 359/216 |
| 5,331,468 | 7/1994 | Noethen | 359/738 |
| 5,367,400 | 11/1994 | Harris et al. | 359/216 |

Primary Examiner—Mark R. Powell
Assistant Examiner—Steven P. Sax
Attorney, Agent, or Firm—Fariba K. Rad

[57] ABSTRACT

An optical system is disclosed which utilizes a pair of binary diffraction optic lenses to reprofile the intensity and the amplitude distribution profiles of a light beam prior to a rotating polygon mirror to profiles in the shapes of a sinc squared function and sinc function in order to generate a square pixel profile both in the intensity and amplitude at the photoreceptor plane. Both binary diffraction optic lenses have a plurality of segments. Each segment of the first binary diffraction optic lens either diverges, converges or passes through without a change, a portion of the light beam. The second binary diffraction optic lens, which is located down stream of the first binary diffraction optic lens, has an equal number of segments as the first binary diffraction optic lens. Each segment of the second binary diffraction optic lens receives the light beam from a respective segment of the first binary diffraction optic lens and collimates the light beam. Some segments of the second binary diffraction optic lens change the optical phase of the portion of the light beam which passes through those segments.

8 Claims, 9 Drawing Sheets

MEANS TO ACHIEVE A SQUARE INTENSITY PROFILE AT AN IMAGE PLANE BY INTENSITY AND PHASE PROFILING

BACKGROUND OF THE INVENTION

This invention relates to an optical system which changes the amplitude distribution profile of a laser light beam from a Gaussian distribution profile to a (sin x)/x distribution profile and changes the intensity distribution profile of the same laser light beam from a Gaussian distribution profile to a $[(\sin x)/x]^2$ distribution profile. In referring to (sin x)/x distribution and $[(\sin x)/x]^2$ distribution, x is the distance measurement from the beam center in the beam cross section. Hereinafter (sin x)/x is referred to as "sinc function" and $[(\sin x)/x]^2$ is referred to as "sinc squared function". More specifically, this invention relates to a raster output scanner in which the amplitude distribution profile and the intensity distribution profile of the light beam are reprofiled by a pair of binary diffraction optic lenses to provide a square pixel profile in both amplitude and intensity at the photoreceptor plane. In the raster output scanner of this invention, the laser light beam is reprofiled prior to impacting a rotating polygon mirror.

Referring to FIG. 1, a conventional raster scanner system 10 utilizes a light source 12, a collimator 14. Pre-polygon optics 16, a multi-faceted rotating polygon mirror 18 as the scanning element, post polygon optics 20 and a photosensitive medium 22. The light source 12, which can be a laser source, produces a light beam 24 and sends it to the rotating polygon mirror 18 through the collimator 14 and the pre-polygon optics 16. The collimator 14 collimates the light beam 24 and the pre-polygon optics 16 focuses the light beam in the sagittal or cross-scan plane onto the rotating polygon mirror 18. The rotating polygon 18 has a plurality of facets 26, each of which is a plane mirror. However, in the tangential or scan plane, the collimated light beam passes through the pre-polygon optics without being altered and it strikes the polygon as a collimated light beam.

The facets 26 of the rotating polygon mirror 18 reflect the light beam 24 and also cause the reflected light 24 to revolve about an axis near the reflection point of the facet 26 of the rotating polygon mirror 18. This reflected light beam can be utilized through the post polygon optics 20 to scan a document at the input end of an imaging system as a raster input scanner (RIS) or can be used in a raster output scanner (ROS) to impinge upon a photographic film or a photosensitive medium 22, such as a xerographic drum (photoreceptor), at the output of the imaging system.

Referring to FIG. 2, typically, a laser light beam has two Gaussian distribution profiles: one for intensity 30 and one for amplitude 32. In FIG. 2, the horizontal axis represents the distance measurement x from the beam center C in the beam cross section and the vertical axis represents intensity and amplitude. Intensity is defined as the number of photons/$cm^2$/sec and the amplitude is defined as the voltage field in the light wave.

Furthermore, intensity 30 is equal to squared amplitude 32 [Intensity= $(Amplitude)^2$]. It should be noted that the bell shape profile of both amplitude and the intensity Gaussian distributions are continued throughout the optical elements in a raster scanning system.

Typically, based on the intensity distribution and the threshold level at the photoreceptor, the spot size at the photoreceptor can be defined. However, the bell shape profile of a Gaussian intensity distribution causes a problem in multilevel xerographic systems. In multilevel xerographic systems, for each color, there is a separate threshold level. Depending on the threshold level, the maximum intensity of the light beam has to be changed. This causes the spot size for different colors to be different.

For example, referring to FIG. 3, different threshold levels 33, 34 and 35 are assigned to three levels of a tri-level printing system. Also, in FIG. 3, there are shown three Gaussian distributions 36, 37 and 38 each having a different maximum intensity. In FIG. 3, the horizontal axis represents the distance measurement x from the beam center C in the beam cross section and the vertical axis represents the intensity. In this system the maximum threshold 33 is assigned to black, a mid-range threshold 34 is assigned to white and a low threshold 35 is assigned to color.

For each threshold level 33, 34 and 35, the maximum intensity of the light beam is changed. For threshold level 35, the maximum intensity is at $I_{MAX1}$. If the threshold level 34 is needed, the the intensity of the light beam will be changed to $I_{MAX2}$. Eventually, for the threshold level 33, the maximum intensity of the light beam will be changed to $I_{MAX3}$. It should be noted that while the intensity of the light beam is changed, the base B of the Gaussian distribution is kept the same, as defined by a fixed beam radius to the $1/e^2$ intensity value.

Due to the bell shape profile of the light beam, the beam width at different threshold levels will be different. Thus for the Gaussian distribution 36, at threshold level 33, the beam width is a, at threshold level 34, the beam width is b and finally at threshold level 35 the beam width is e. The variation of the beam, width at different threshold levels causes a spot size variation for different colors. This is a particular problem in multilevel xerographic systems where pixel color depends upon the beam intensity.

Therefore for the Gaussian distribution 36 of FIG. 3, referring to FIG. 4, the black level creates a spot with a diameter equal to a, the white level creates a spot with a diameter equal to b and the color level creates a spot with a diameter equal to e. This causes a multicolored halos around each spot or pixel.

In addition, if the output power of the laser diode changes, the Gaussian intensity distribution changes and therefore the spot sizes of the different colors also change.

It should be noted that even if one color is used meaning that one threshold level is selected, by variation of the output power of the laser diode, the maximum intensity changes and as a result, the spot size changes.

Referring to FIG. 5, It is an object of this invention to provide a square or approximately square intensity profile at the photoreceptor plane in which the width of the light beam d at different threshold levels 33, 34 and 35 stays the same or substantially the same. With a square intensity profile, even if the power output of the laser diode fluctuates, the beam width for different colors stays the same. It should be noted that a light beam with square intensity profile will inherently have a square amplitude profile. Hereinafter, when the terms "square intensity profile" and "square amplitude profile" are used, such terms shall imply that the beam width at different threshold levels will be substantially the same.

SUMMARY OF THE INVENTION

In accordance with the present invention, the Gaussian intensity distribution profile and the Gaussian amplitude distribution profile prior to a rotating polygon mirror will be reprofiled to profiles in the shapes of a sinc squared function and a sinc function respectively in order to generate a square pixel profile in both amplitude and intensity on the photoreceptor plane. This invention utilizes a pair of binary diffraction optic lenses to accomplish the reprofiling of the light beam. Both binary diffraction optic lenses of this invention have an equal number of segments. Each segment of the first binary diffraction optic lens either diverges, converges or passes through without a change, a portion of the light beam. Each segment of the second binary diffraction optic lens receives the light beam from a respective segment of the first binary diffraction optic lens and collimates the light beam. Some segments of the second binary diffraction optic lens also change the optical phase of the light beam in the areas that pass through these segments.

DESCRIPTION OF THE PREFERRED EMBODIMENT

Figure 1:
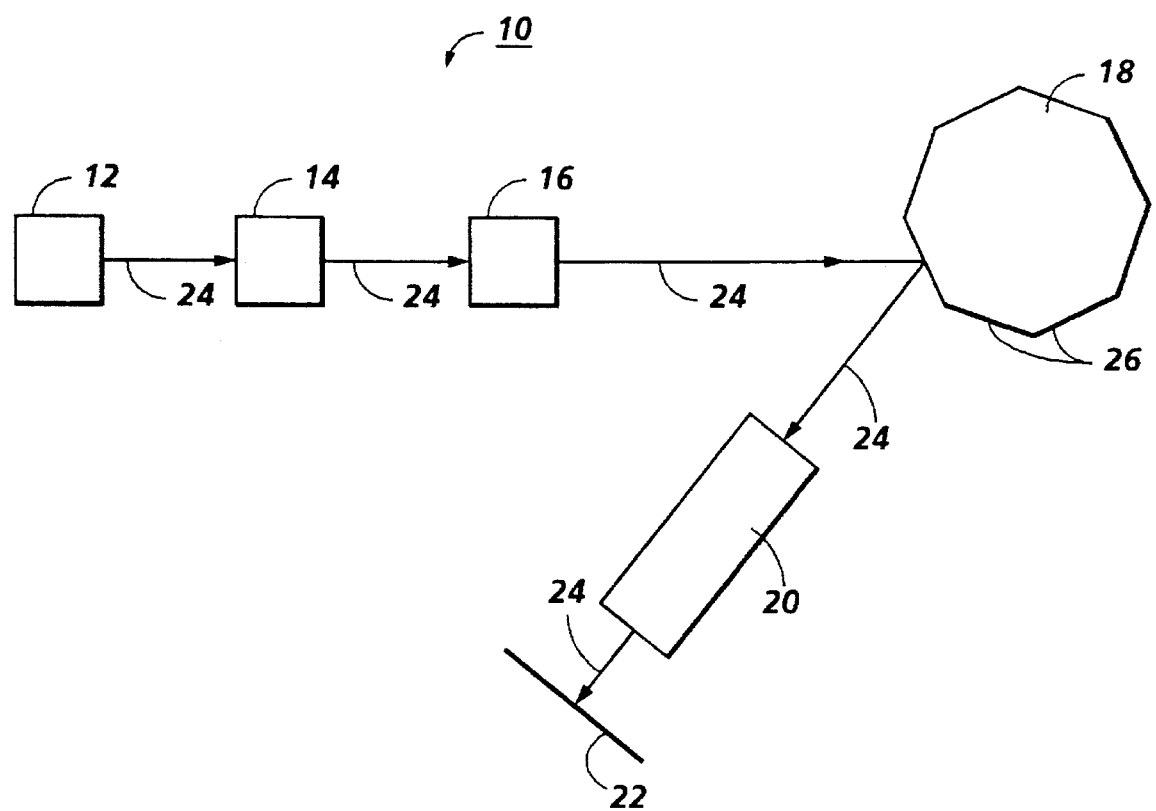
FIG. 1 shows a prior art raster scanner system.
Figure 2:
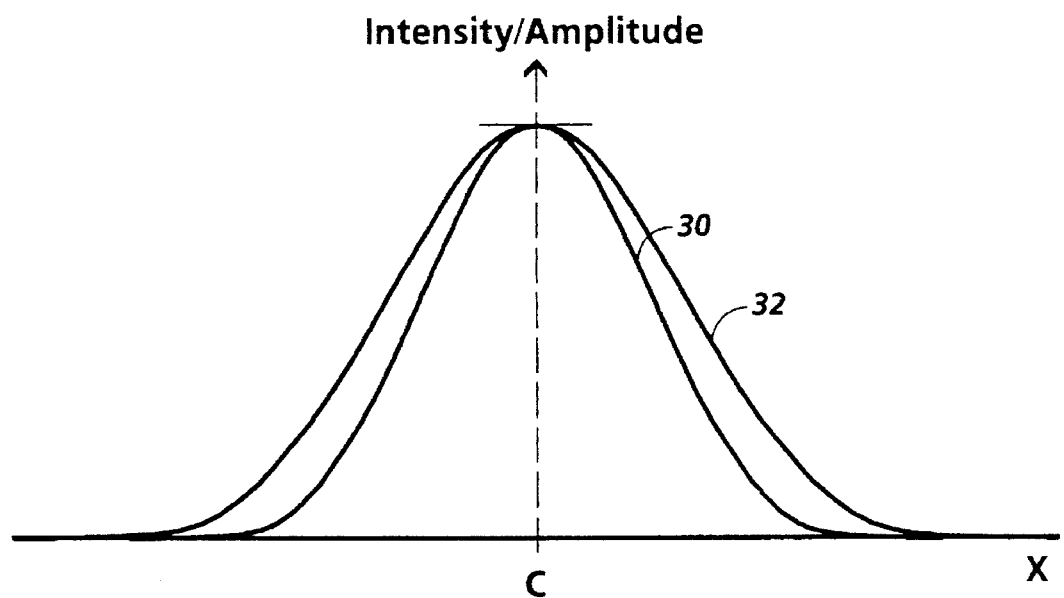
FIG. 2 shows the Gaussian intensity distribution profile and the Gaussian amplitude distribution profile of a laser light beam.
Figure 3:
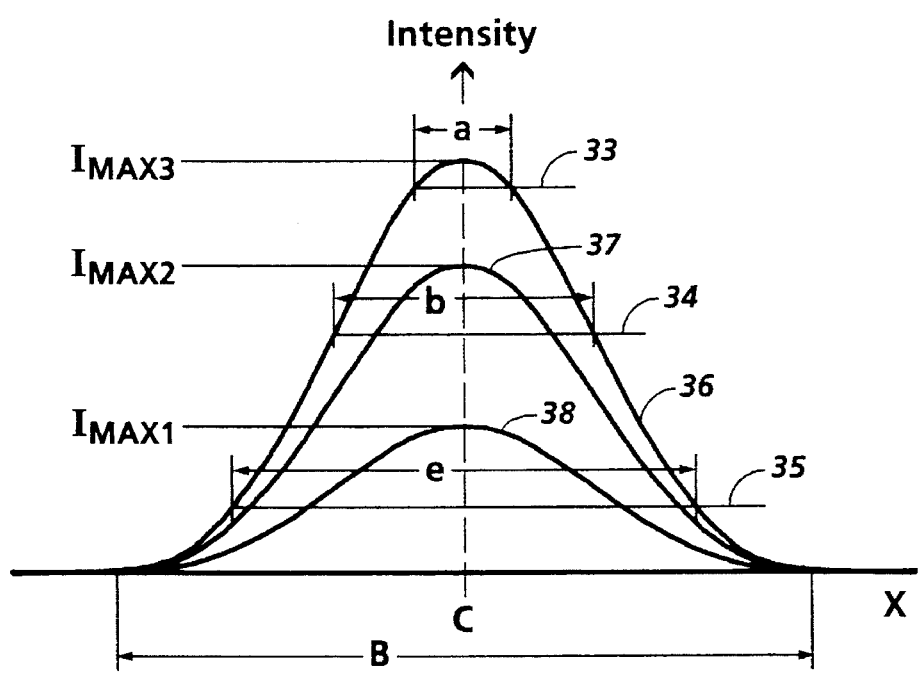
FIG. 3 shows different threshold levels assigned to three levels of a tri-level printing system and the corresponding Gaussian intensity distribution profiles for each threshold level.
Figure 4:
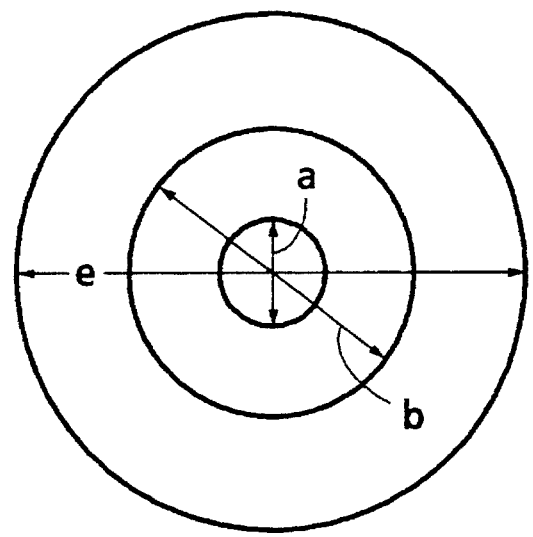
FIG. 4 shows three spots generated by the three levels of FIG. 3.
Figure 6:
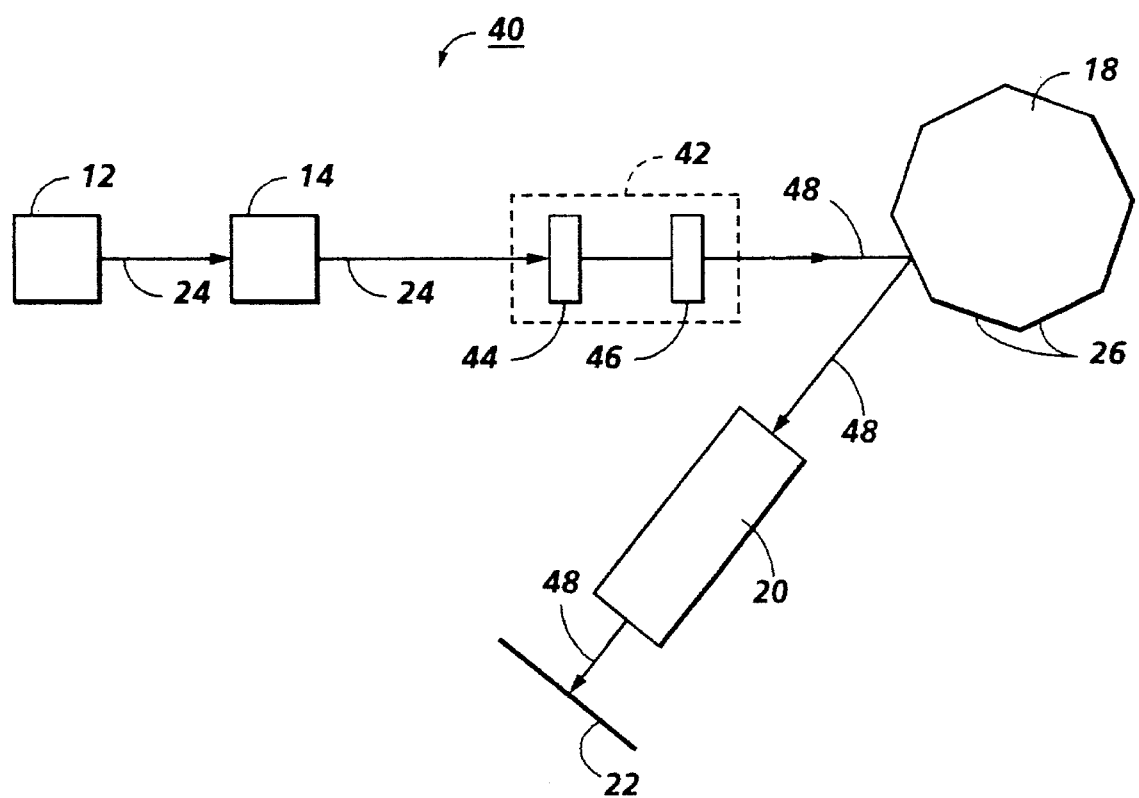
FIG. 6 shows a block diagram 40 of the raster output scanner of this invention.

Referring to FIG. 6, there is shown a block diagram 40 of the raster output scanner of this invention. In this invention, the pre-polygon optics 16 of FIG. 1 (prior art) is replaced by the pre-polygon optics 42. The pre-polygon optics 42 contains two optical elements 44 and 46 which can be bulk, Fresnel or binary diffractive optic lenses. However, for consistency, throughout the description of this invention, the optical elements 44 and 46 are referred to as binary diffractive optic (BDO) lenses.

It should be noted that any one of the above optical elements anamorphic in the sense that they provide different functions in the scan plane and in the cross-scan plane. They are also aspherical in the sense that their effective surface profiles cannot be represented by a spherical or a cylindrical surface.

Binary diffraction optic (BDO) lenses are made using the same techniques used to fabricate VLSI circuits, as disclosed in Binary Optics Technology: The Theory and Design of Multi-level Diffractive Optical Elements by G. J. Swanson of the Lincoln Laboratory at the Massachusetts Institute of Technology, (Technical Report 854, 14 August 1989) and the resulting U.S. Pat. No. 4,895,790. A designer develops an idealized diffractive surface structure mathematically, then using a computer, defines a series of precise, microlithographic masks. A mask pattern is printed into a photoresist coating typically using a UV light source and then transferred into the optical substrate by ion milling or plasma etching.

In this invention, a laser light source 12 produces a light beam 24 and sends it to a rotating polygon mirror 18 through a collimator 14 and a pair of BDO lenses 44 and 46. The collimator 14 collimates the light beam 24 in the tangential or scan plane and brings the light beam to a focus at the rotating polygon mirror 18 in the sagittal or cross-scan plane. The pre-polygon optics 42 reprofiles the intensity distribution profile and the amplitude distribution profile of the collimated light beam in the tangential plane while maintaining the collimation of the light beam.

The pair of BDO lenses 44 and 46 reprofile the Gaussian distribution profile of the light beam 24 prior to the rotating polygon mirror 18. The facets 26 of the rotating polygon mirror 18 effect the reprofiled light beam 48 and send the reflected light beam 48 to the photoreceptor 22 through the post polygon optics 20. The pair of BDO lenses 44 and 46 reprofile the Gaussian distribution profile of the light beam 24 in such a manner that when the light beam strikes the photoreceptor 22, it will have a square distribution profile both in intensity and amplitude.

In order to comprehend this invention it is necessary to study the changes that happen on a Gaussian distribution in general as the light beam travels through a raster scanner.

Typically, in a conventional raster scanner, since the collimator generates a far field in the tangential plane on the rotating polygon mirror, as the light beam from the laser light source travels through the collimator and the pre-polygon optics, it maintains its Gaussian distribution profiles. Therefore, when the light beam strikes the rotating polygon mirror, it has Gaussian distribution profiles both for the intensity and the amplitude.

However, since the f-theta lens in the post polygon optics generates a near field in the tangential plane on the photoreceptor plane, when the light beam travels through the post polygon optics, in general its distribution profiles change. The change in the post polygon optics can be described by Fourier transform. This means that any distribution profile at the polygon will be changed to its Fourier transform at the photoreceptor. Since the Fourier transform of a Gaussian distribution is also a Gaussian distribution, a light beam with Gaussian distribution profile at the rotating polygon mirror will result in another Gaussian distribution profile at the photoreceptor plane. It should be noted that the Gaussian distribution profile of the light beam at the photoreceptor is smaller since the light beam is brought to a focus. However, a Gaussian distribution profile at the photoreceptor creates all the aforementioned problems (color variation around each spot due to different spot sizes for different colors and due to the fluctuation of the light source amplitude).

The solution to the aforementioned problems is to have a square distribution profile at the photoreceptor plane. In order to have such a distribution profile at the photoreceptor plane, the distribution at the rotating polygon mirror should be the inverse of the Fourier transform of the square distribution profile. It is well known that the inverse of Fourier transform of a square function is a (sin x)/x or sinc function.

Figure 7:
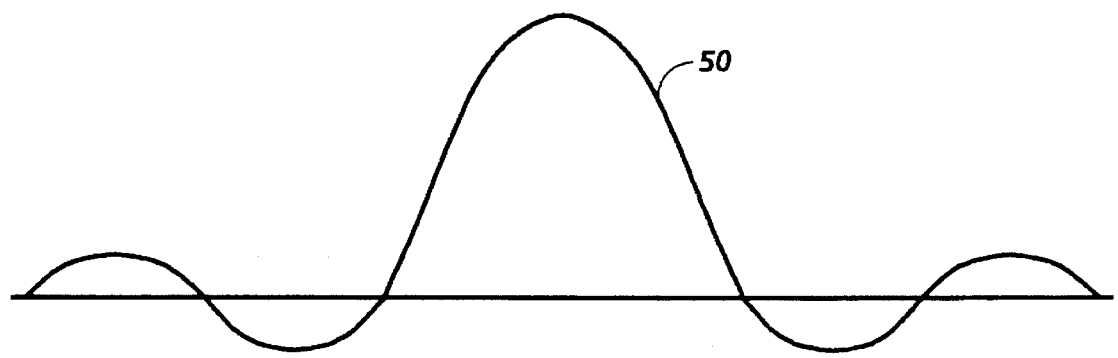
FIG. 7 shows a light beam with an amplitude distribution profile in the shape of a sinc function.

Therefore, referring to FIG. 7, in order to have a square distribution profile at the photoreceptor plane, it is necessary to have a light beam which has an amplitude distribution profile in the shape of a sinc function 50. In this manner, the reflected light beam from the rotating polygon mirror will have the profile of a sinc function and therefore its Fourier transform at the photoreceptor plane will have the shape of a square function.

Figure 8:
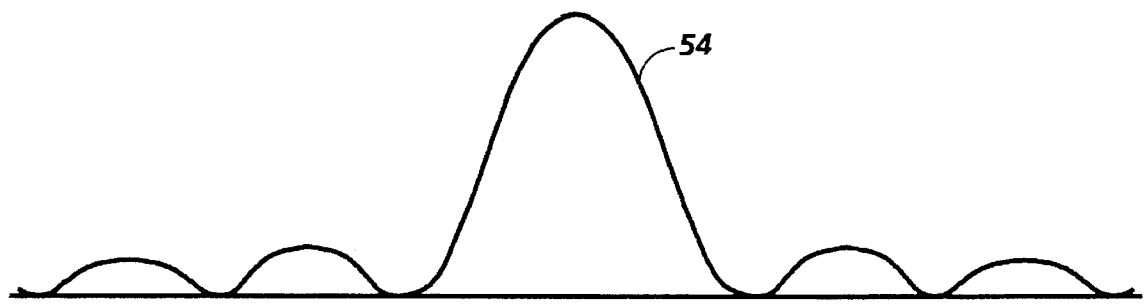
FIG. 8 shows a light beam with an intensity distribution profile in the shape of a sinc squared function.

It should be noted that since a light beam has both intensity and amplitude, the square profile will be square in both amplitude and intensity. The inverse Fourier transform of the amplitude of a square profile is a sinc function 50 as shown in FIG. 7 and its intensity is a sinc squared function 54 as shown in FIG. 8.

It should be noted that in contrast to amplitude distribution profile 50 of FIG. 7, the intensity distribution profile 54 does not include optical phase. However, the amplitude distribution profile 50 does.

To define the sinc function and sinc squared function, first the requirements of a square function at the photoreceptor has to be defined. Then, an inverse Fourier transform of the square function for the amplitude will determine, the specific elements of the sinc function needed at the rotating polygon mirror. It should be noted that the elements of the sinc function have to be scaled to incorporate the effective focal length of the post polygon optics. Once the sinc function is defined, the sinc squared function is inherently defined.

Therefore, in order to generate a square distribution profile at the photoreceptor, the Gaussian distribution of both intensity profile and the amplitude profile of a laser light beam have to be reprofiled to sinc squared function and sine function respectively prior to the polygon.

Figure 9:
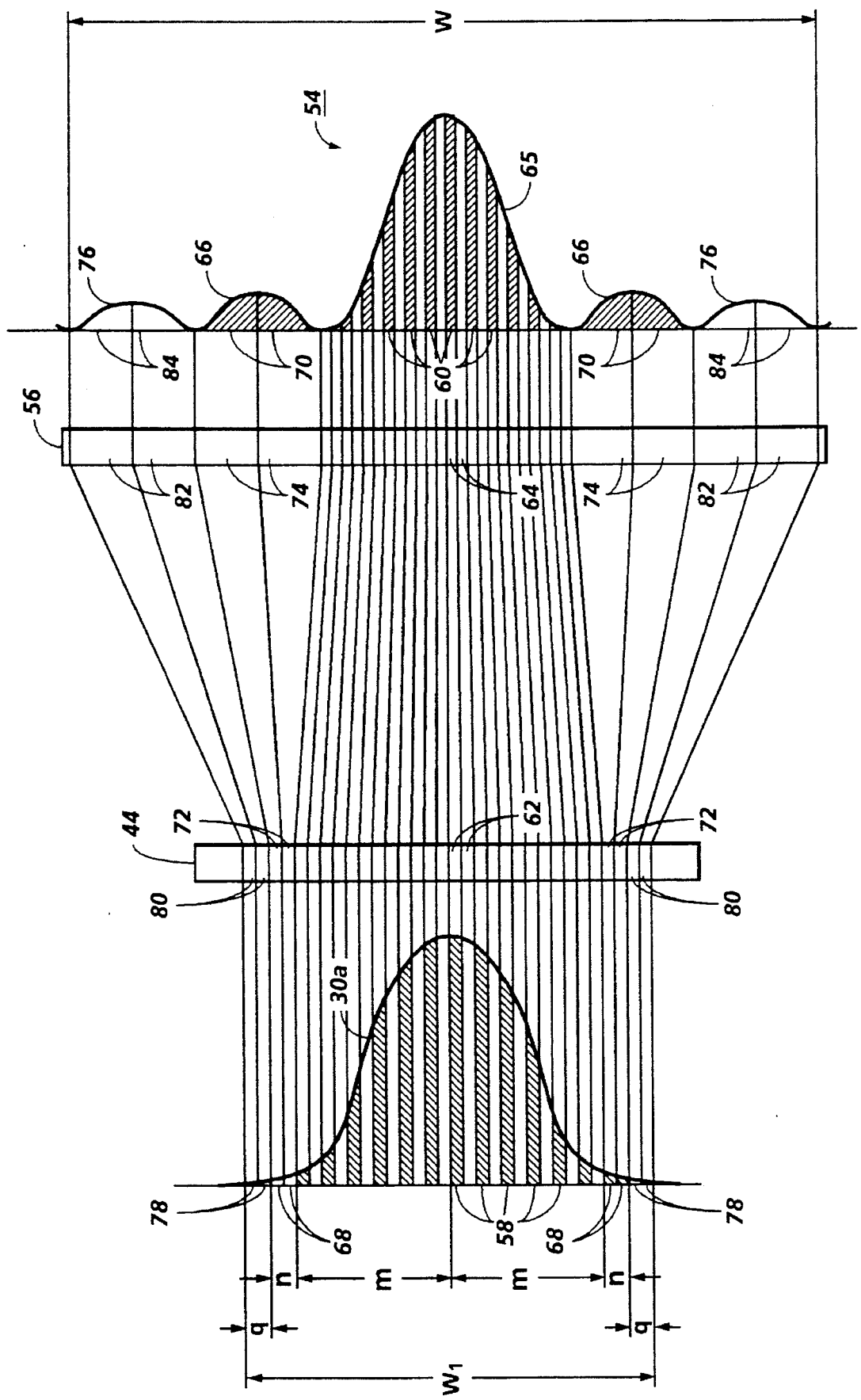
FIG. 9 shows a pair of BDO lenses which reprofile a Gaussian intensity distribution profile into an intensity distribution profile in the shape of a sinc squared function.

Referring to FIG. 9, there are shown a pair of BDO lenses 44 and 56 which can accomplish such reprofiling. To design BDO lenses 44 and 56, a Gaussian intensity distribution profile 30a of a light beam has to be defined as an input profile and the intensity distribution profile 54 of the reprofiled light beam in the shape of the sinc squared function has to be defined as an output profile. The reason for selecting the intensity distribution rather than the amplitude distribution for the design of the BDO lenses is that the input distribution profile is divided into the bands of energy and the BDO lenses will be designed to redistribute the energy bands. This is possible only through the intensity distribution.

Next, the Gaussian intensity distribution profile 30a within the areas marked as m is divided into a number of infinitesimal sections or bands 58 of equal widths. In the areas marked as m, m is a calculated percentage of the energy under the distribution 30a on each side of the distribution 30a which will generate half of the main lobe 65 of profile 54. In the preferred embodiment of this invention, m is equal to 98.618%.

Profile 54, which has a width W equal to the width of a facet 26 (FIG. 6) of the rotating polygon mirror 18 (FIG. 6), will also be divided into infinitesimal sections or bands 60 of widths to be determined by relative intensities of profiles 30a and 54. The number of sections 60 on each side of the main lobe 65 of profile 54 has to be equal to the number of the sections 58 of the Gaussian distribution profile 30a in the corresponding areas marked as m. The combined energy of both areas shown as m represents the energy of the main lobe of profile 54.

In FIG. 9, the width $W_1$ of the Gaussian intensity distribution profile 30a of the light beam from the laser diode is shown to be less than the width W of profile 54. However, it should be noted that the width $W_1$ of the Gaussian intensity distribution profile of the light beam from the laser diode can be larger or equal to the width W of profile 54. Of course, the BDO lenses 44 and 56 should be designed for a given width $W_1$ of the Gaussian distribution profile of the light beam from the laser diode and the width W required at the rotating polygon mirror.

To convert the Gaussian intensity distribution profile 30a into intensity distribution profile 54, each one of the BDO lenses 44 and 56 is designed to have a separate segment for each band. Each one of segments 62 of BDO lens 44 is designed to convert the bands 58 from the Gaussian distribution profile 30a into bands 60 of profile 54 respectively. Also, each one of the segments 64 of BDO lens 56 is designed to collimate each corresponding band.

Depending on the sections 58 of the Gaussian intensity distribution profile 30a and the sections 60 to the intensity distribution profile 54, the BDO lens 44 should be designed to converge, diverge or pass through without a change, the bands of Gaussian distribution profile 30a in order to generate the bands of the sinc squared function 54. Each segment 62 of the BDO 44 has to be capable of receiving a band 58 and changing it in such a manner that when the band passes through the corresponding collimating segments of the BDO 56, it will be as wide as the, corresponding band 60 in profile 54. The segments 64 of the BDO lens 56 receives and collimates the bands from the respective segments 62 of the BDO lens 44.

In order to generate the lobes 66 of profile 54, the areas marked as n have to be divided into sections 68 of equal distance bands and also the lobes 66 have to be divided into sections 70 of widths to be determined by the relative intensities of the profiles 30a and 54. The segments 72 of the BDO lens 44 have to diverge the bands from the Gaussian distribution profile 30a and segments 74 BDO lens 56 have to collimate the bands from the BDO lens 44 in order to generate the bands 70 of the lobes 66. In the same manner, the lobes 76 should be generated from the bands 78 in the areas marked as q. The segments 80 and 82 of the BDO lenses 44 and 56 have to diverge and collimate the bands from the Gaussian distribution profile 30a respectively in order to generate the bands 84 of the lobes 76. Higher order lobes can be similarly generated. The energy in both n and q are calculated percentages of the energy under the distribution 30a in the width $W_1/2$ which will generate lobes 66 and 76. In the preferred embodiment of this invention n is equal to 0.851% and q is equal to 0.531%.

It should be noted that in designing the BDO lenses 44 and 56 the Gaussian intensity distribution profile 30a was divided into equally spaced bands. However, dividing the Gaussian distribution profile 30a into equally spaced bands is for convenience. Other spacings could also be used. What is necessary is that the optical energy in any band 58 (resulting from the width and intensity of each band) will be spread uniformly (or nearly so) over the corresponding band 60 such that the energy and the width of each band will result in the required intensity of the profile 54.

Figure 10:
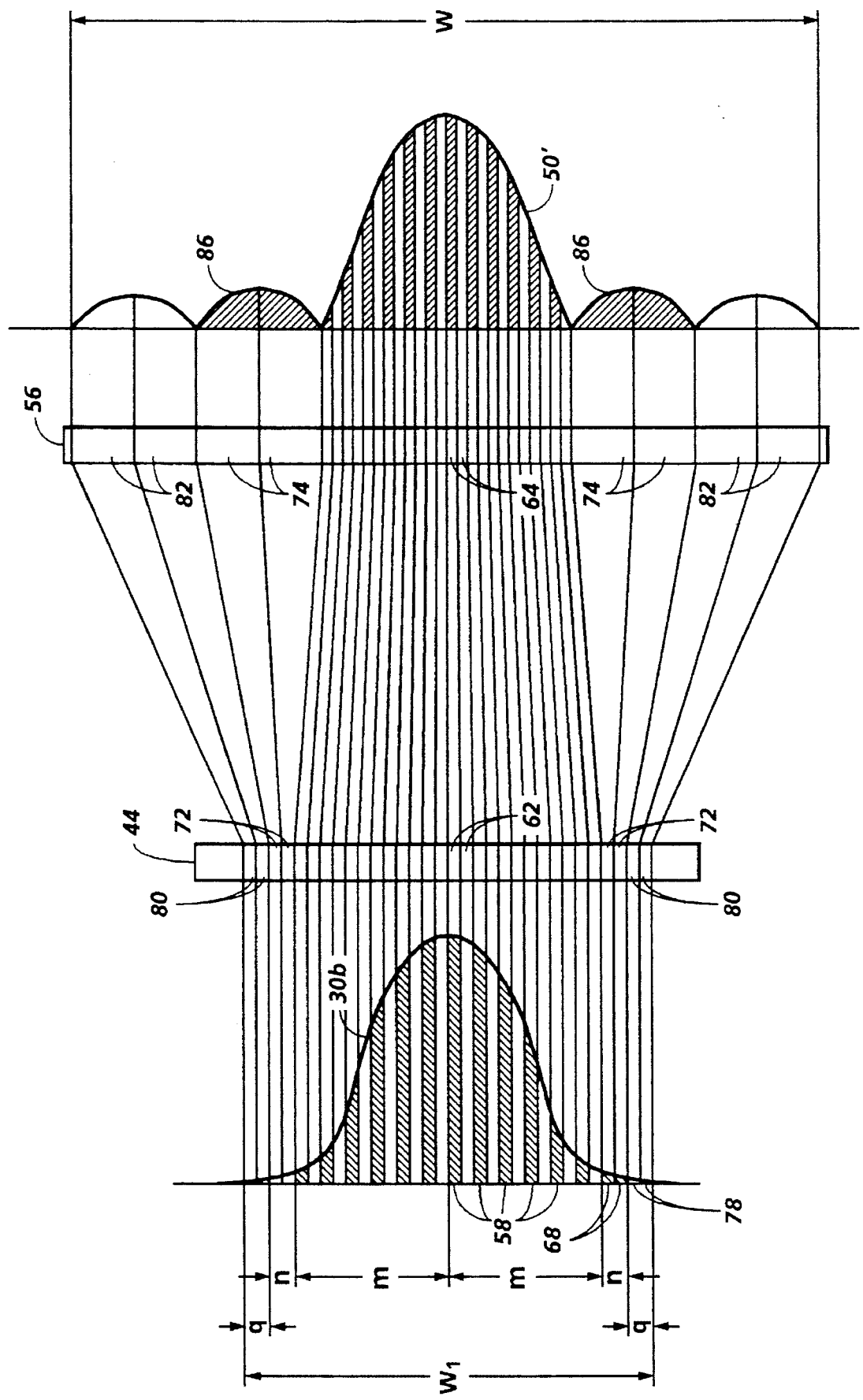
FIG. 10 shows the same pair of BDO lenses of FIG. 9 reprofiling an amplitude profile.

Referring to FIG. 10, the BDO lenses 44 and 56 automatically reprofile the Gaussian amplitude profile into sinc amplitude profile with the exception of the phases. In the example shown in FIGS. 9 and 10, the BDO lenses 44 and 56 do not generate negative phases. As it can be observed, the lobes 86 of profile 50' have an opposite optical phase compared to the sinc function 50 of FIG. 7. However, a sinc function requires both positive and negative phases.

Figure 11:
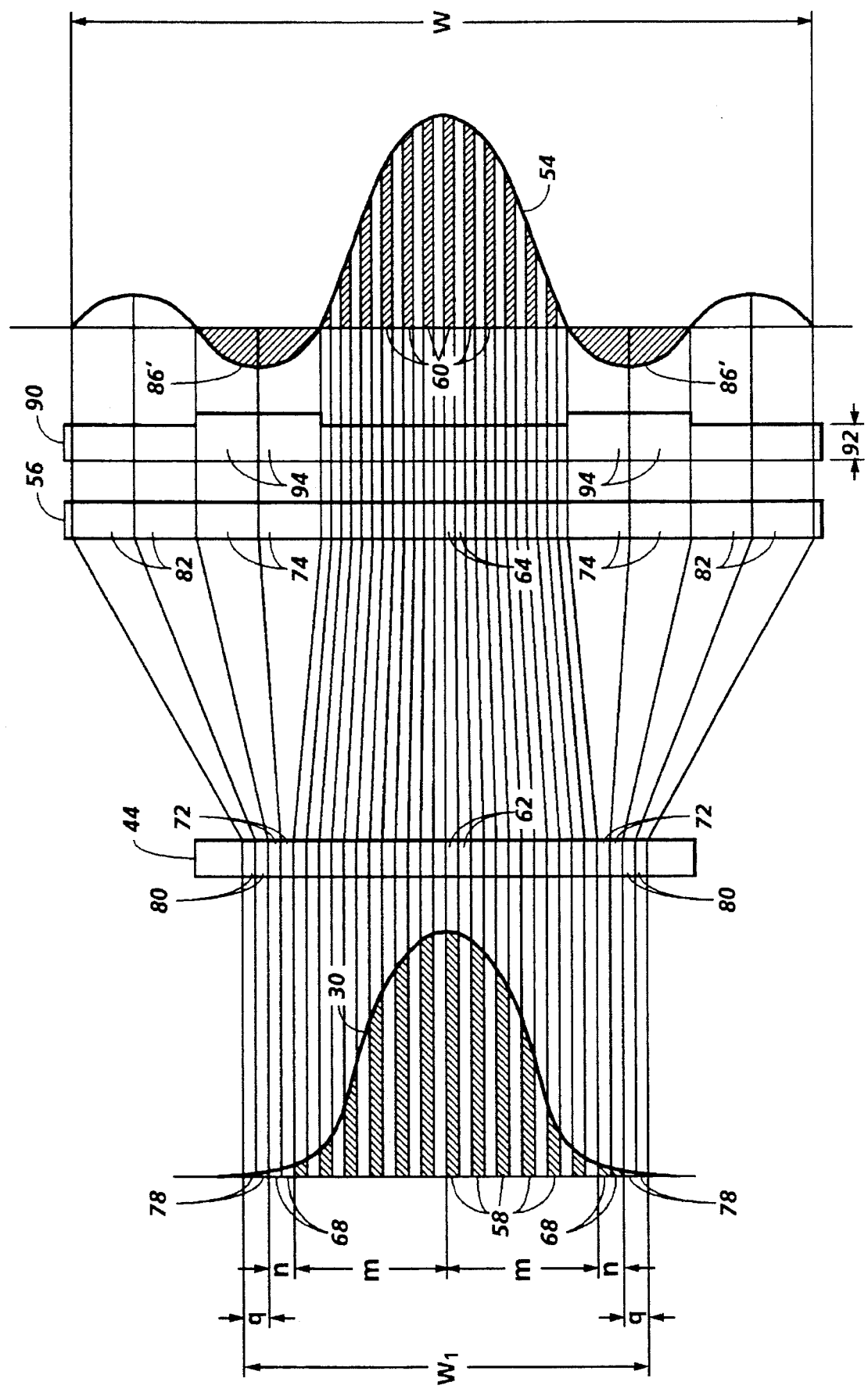
FIG. 11 shows the arrangement of FIG. 10 in conjunction with a third BDO lens to change and correct the optical phase of some of the lobes in order to generate a true sinc function.

Therefore, referring to FIG. 11, a third BDO 90 will be utilized to change the optical phase of the lobes 86 of profile 50' of FIG. 10 to an optical phase shown on lobes 86'. It is well known that when a light beam passes through a medium and an identical light beam passes through the air, if the thickness of the medium is equal to $\lambda/2(N-1)$ (where $\lambda$ is the wavelength of the light beam and N is the refractive index of the medium), then the light beam exiting the medium will have a phase opposite to the phase of the light beam passing through the air.

By utilizing this concept, a BDO lens 90 can be designed to only change the phase of the lobes 86 and alternate higher order lobes. BDO 90 has a thickness 92. However, the thickness of the BDO in the areas 94 is the thickness $92+(\lambda 2(N-1))$. The thickness difference in different areas causes the light beam to exit the BDO lens in the proper phase relationships. Portions of the light beam which pass through those areas with the thickness 92 will have an opposite phase to that of the light beam in the areas 94 with the thickness difference of $(\lambda/2(N-1))$.

Figure 12:
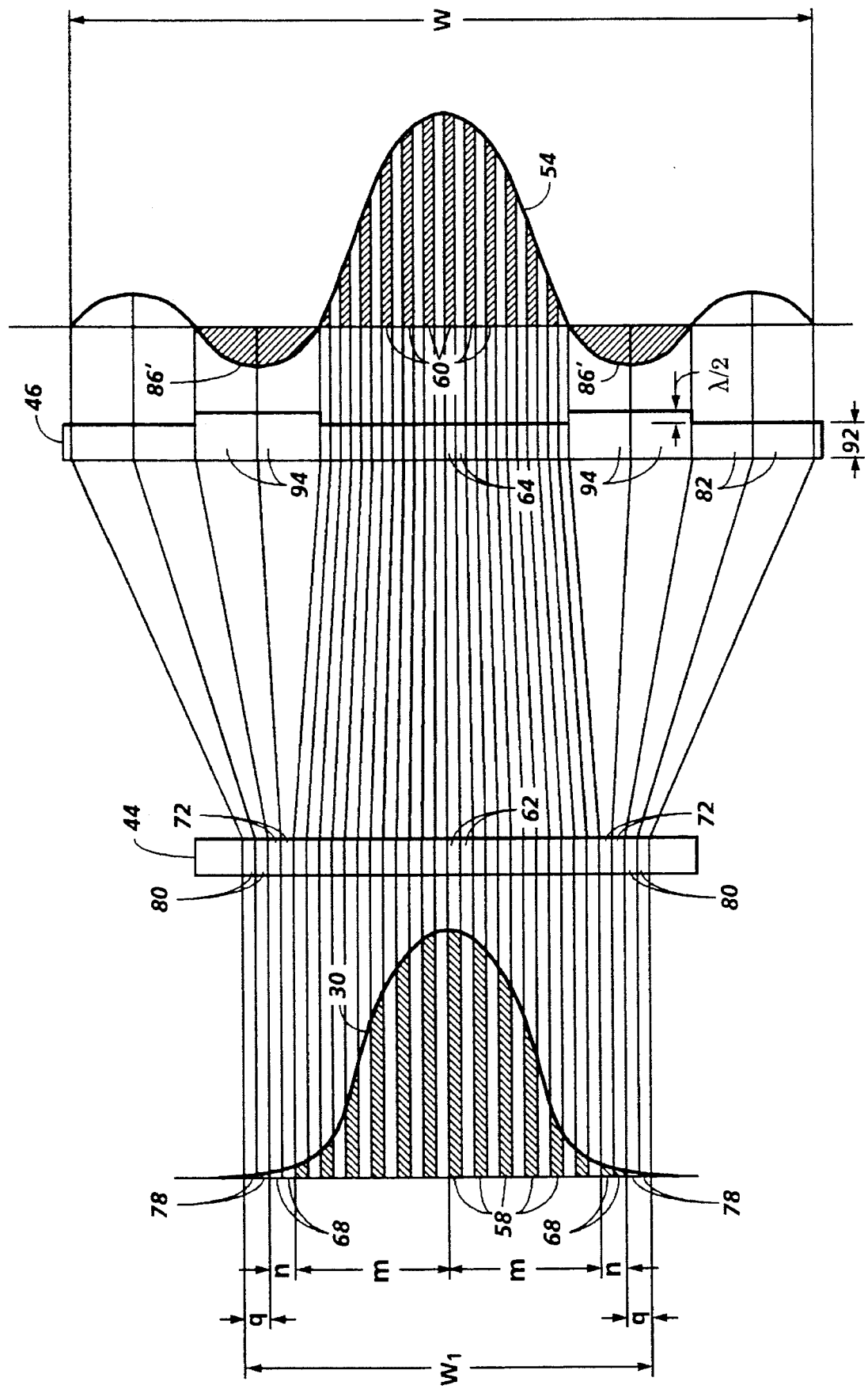
FIG. 12 shows a pair of BDO lenses which reprofile an amplitude distribution profile to an amplitude distribution profile in the shape of a sinc function with correct optical phases.

Referring to FIG. 12, to simplify the design of this invention, the two BDO lenses 56 and 90 of FIG. 10 can be combined into one BDO 46 of FIG. 6. BDO 46 is segmented to collimate the light beam and also the thickness of the segments in the areas 94 are increased to change the phase of the light beam in those segments.

Figure 5:
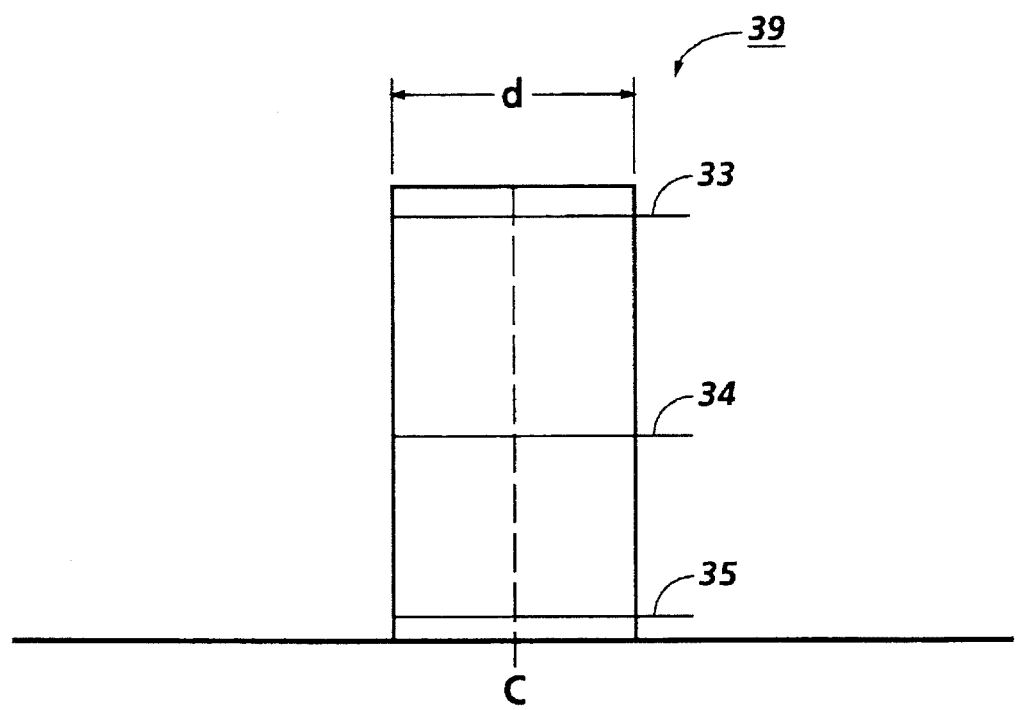
FIG. 5 shows a square intensity profile.

With the two BDO lenses 44 and 46, the Gaussian amplitude distribution profile and the Gaussian intensity distribution profile of a light beam prior to the rotating polygon will be reprofiled to a sinc function and sinc squared function respectively. As a result, the Fourier transform of this light beam will generate a square pixel profile both in the intensity and the amplitude at the photoreceptor plane as shown in FIG. 5.

What is claimed is:

1. A raster scanning system comprising:

a light source emitting a light beam having an intensity distribution profile and an amplitude distribution profile;

a photo sensitive medium;

an optic lens system being arranged to receive said light beam from said light source and being so constructed and arranged to reprofile the intensity distribution profile and the amplitude distribution profile of said light beam in such a manner that the reprofiled intensity distribution profile will have a shape of a sinc squared function and the reprofiled amplitude distribution profile will have a shape of sinc function;

a rotating scanning means arranged to receive said reprofiled light beam from said optic lens system and scan said light beam across said photo sensitive medium;

post scanning optical means located between said scanning means and said photo sensitive medium in the path of the light beam from said scanning means; and said post scanning optical means being so constructed and arranged to receive said reprofiled light beam from said scanning means and convert said reprofiled light beam to a square beam profile on said photo ,sensitive medium through a Fourier transform.

2. The raster scanning system recited in claim 1, wherein said optic lens system is a binary diffraction optic lens system.

3. The raster scanning system recited in claim 2, wherein said binary diffraction optic lens system comprises a first optical element and a second optical element spaced along said light beam path from said first optical element.

4. The raster scanning system recited in claim 3, wherein said first optical element has a plurality of segments and said second optical element has a plurality of segments equal to the number of segments of said first optical element.

5. The raster scanning system recited in claim 4, wherein at least one segment of said first optical element converges a portion of said light beam, at least one segment of said first optical element diverges a portion of said light beam and at least one segment of said first optical element passes through without a change a portion of said light beam and each segment of said second optical element receives a portion of said light beam from a respective segment of said first optical element and collimates said portion of said light beam and at least two segments of said second optical element change the optical phase of said portion of said light beam received from said respective segment of said first optical element.

6. The raster scanning system recited in claim 2, wherein said binary diffraction optic lens system comprises a first optical element, a second optical element and a third optical element.

7. The raster scanning system recited in claim 6, wherein said first optical element has a plurality of segments, said second optical element has a plurality of segments equal to the number of segments of said first optical element and said third optical element has a plurality of segments equal to the number of segments of said first optical element.

8. The raster scanning system recited in claim 7, wherein at least one segment of said first optical element converges a portion of said light beam, at least one segment of said first optical element diverges a portion of said light beam and at least one segment of said first optical element passes through without a change a portion of said light beam, each segment of said second optical element receives a portion of said light beam from a respective segment of said first optical element and collimates said portion of said light beam and at least two spaced apart portions of said third optical element change the optical phase of at least two portions of said light beam received from at least two spaced apart segments of said second optical element.

* * * * *